J. TROUT.
Machines for Raking and Baling Hay.
No. 147,713. Patented Feb. 17, 1874.
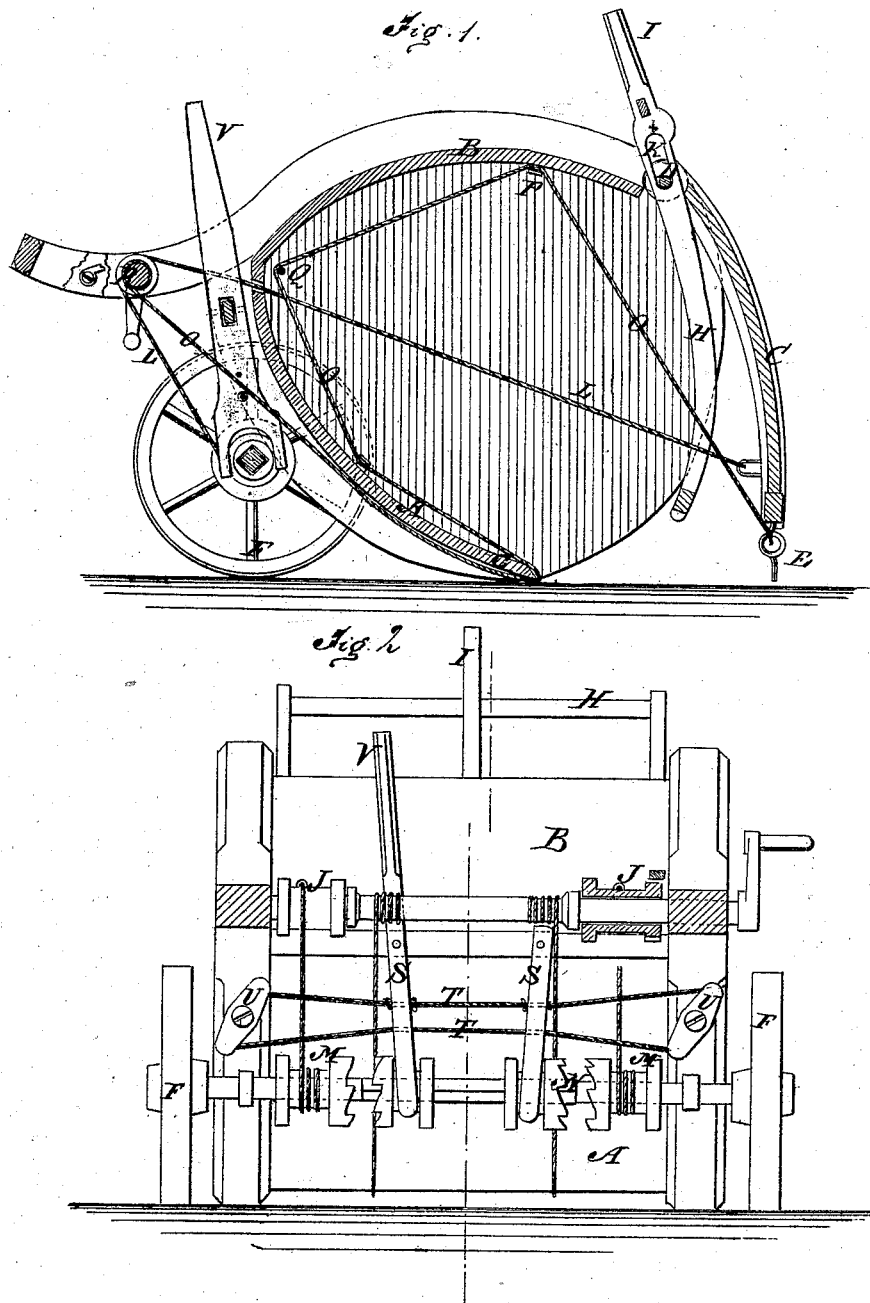

UNITED STATES PATENT OFFICE.

JOHN TROUT, OF SOUTH PASS CITY, WYOMING TERRITORY.

IMPROVEMENT IN MACHINES FOR RAKING AND BALING HAY.

Specification forming part of Letters Patent No. 147,713, dated February 17, 1874; application filed April 12, 1873.

*To all whom it may concern:*

Be it known that I, JOHN TROUT, of South Pass City, in the county of Sweetwater and Territory of Wyoming, have invented a new and Improved Hay Raking and Baling Machine, of which the following is a specification:

The invention relates to machines for raking and baling hay at one operation; and consists in certain features of novelty and utility hereinafter described, and pointed out in the claims.

Figure 1 is a transverse sectional elevation of my improved raking and baling machine, and taken on the line *x x* of Fig. 2; and Fig. 2 is a front elevation.

Similar letters of reference indicate corresponding parts.

A represents the bottom and front side, and B the top side, of a kind of triangular case, inclosed at the ends and open at the rear, the side C of which is hinged to the rear edge of the top, at D, and, being provided with short spring-teeth E at the lower edge, constitutes the rake for gathering the hay in front of it as the case, which is mounted on the truck-wheels F, is drawn along the ground with the rear edge G bearing on the hay lying on the ground. H represents a packing or stuffing fork, also pivoted at D, and arranged in front of the side C, to be swung forward from time to time by the lever I, to press the hay gathered in front of the rake into the case. It is provided with slotted holes K for the pivot-rod, whereby it can be lifted up when swung back to pass over and drop behind the hay gathered up during a movement forward for stuffing the case. L represents a couple of strong ropes connected to the swinging side C near the lower edge, and extending forward through the front of the case, over rollers J on the shaft R, to drums M on the axle, which are provided with clutches N to be geared into the axle, and be turned by the horse to force the side C onto the case for pressing the hay and forming the bale. The tying-cords O are attached to the lower edge of the side C and passed around the interior of the case over spring-holders P, from which they can be readily detached, also over a rod, Q, which can be pulled out to release them, and around the edge G to shaft R, having a hand-crank, by which they can be drawn tightly around the bale for fastening it.

For working the machine on soft, marshy ground by hand, where the horses cannot go, the ropes O for actuating the side C may be disconnected from the drums M and attached to drum R, to be actuated by the hand-crank; but in this case the tying-cords will have to be detached from drum R.

The sliding clutches for connecting the drums M with the axle to be turned by it are actuated by levers S, pivoted at one end to the frame, and connected together by cords T, working over guides U, so as to be shifted simultaneously by the prolongation V of one lever, S.

Having thus described my invention, I claim as new and desire to secure by Letters Patent—

1. A case having a hinged side, C, provided with teeth E, and folding within the sides A B, as described, to serve both as follower and rake.

2. The slotted fork H I, pivoted between the hinged side C and rigid sides A B, to enable the operator to transfer the hay to the case by raising, lowering, and turning the same, in the manner set forth.

3. The combination of the drums M, having half-clutches, and arranged loosely on an axle having half-clutches fast thereon, with the cords L and the hinged side C of a case, A B, as and for the purpose specified.

4. The combination, with case A B, having holders P Q, of the tying-cord O, hinged side C, and cranked roll R, as and for the purpose described.

JOHN TROUT.

Witnesses:
L. B. TRIPP,
H. C. MINER.